US005244722A

United States Patent [19]

Kummermehr et al.

[11] Patent Number: 5,244,722

[45] Date of Patent: Sep. 14, 1993

[54] MOLDED CASTINGS FROM MINERAL WOOL AND THE PROCESS FOR OBTAINING THEM

[75] Inventors: Hans Kummermehr, Ludwigshaffen; Georg Mueller, Weinheim, both of Fed. Rep. of Germany

[73] Assignee: Isover Saint-Gobain, Courbevoie, France

[21] Appl. No.: 758,218

[22] Filed: Sep. 12, 1991

Related U.S. Application Data

[63] Continuation of Ser. No. 504,410, Apr. 4, 1990, abandoned.

[30] Foreign Application Priority Data

Apr. 4, 1989 [DE] Fed. Rep. of Germany ....... 3910860
Jun. 23, 1989 [EP] European Pat. Off. ....... 89.111505.7

[51] Int. Cl.[5] ......................... B32B 5/16; C03C 13/06

[52] U.S. Cl. .................................. 428/283; 428/288; 428/323; 428/325; 428/328; 428/331; 428/446; 501/36

[58] Field of Search ............... 428/283, 288, 323, 325, 428/328, 331, 389, 446; 524/34; 252/62; 501/36

[56] References Cited

U.S. PATENT DOCUMENTS

| | | | |
|---|---|---|---|
| 3,567,667 | 3/1971 | Rumbold | 524/34 |
| 3,909,347 | 9/1975 | Warren | 428/283 |
| 4,041,199 | 8/1977 | Cartwright | 428/283 |
| 4,233,078 | 11/1980 | Brown | 106/56 |

*Primary Examiner*—Jenna L. Davis
*Assistant Examiner*—Christopher Brown
*Attorney, Agent, or Firm*—Oblon, Spivak, McClelland, Maier & Neustadt

[57] ABSTRACT

A molded casting from mineral wool, obtained notably through vacuum casting, displaying specific properties resulting from the addition of solid particles and in which mineral fibers are stabilized by a binder is disclosed. The solid particles are incrusted among the mineral fibers in the form of islets and have a particle measurement on the average below or equal to 4 microns.

7 Claims, No Drawings

MOLDED CASTINGS FROM MINERAL WOOL AND THE PROCESS FOR OBTAINING THEM

This application is a continuation of application Ser. No. 07/504,410, filed on Apr. 4, 1990, now abandoned.

BACKGROUND OF THE INVENTION

1. Field of the Invention

The invention relates to molded castings from mineral wool, obtained notably through a process of vacuum casting, displaying specific properties resulting from the addition of solid particles and in which the mineral fibers are stabilized by a bond. The invention also relates to processes for the manufacture of such a molded casting.

2. Discussion of the Background

Molded castings from mineral wool, used in particular as setting plates or as bushings for encasing pipes, generally are manufactured by dispersing mineral wool in a bond suspension, then draining and drying the mineral wool thus prepared on a draining mat or in a mold by vacuum suction. Silica sol and starch are known to be used as bond. The mineral wool is, for example, rock wool, glass wool, aluminosilicate wool, or a combination of these products.

This process also makes it possible to color the mineral wool completely, by adding a colorant to the bond suspension. For a black coloration of the molded casting, an appropriate blackening agent thus is added, for example activated carbon, carbon black or printer's black.

To obtain an adequate incrustation of the solid particles on the fibers and achieve therein a uniform bonding with the aid of the bond and/or assure a uniform coloring of the final product, the silica sol, starch, color pigment must be added to the water in sufficient quantity. In practice, one always works with an excess of bond, a not-insignificant quantity of which turns up in the suctioned water.

This excess of bond in the suspension induces the formation of colloids and thus a thickening of the dispersion, which is not favorable to a good incrustation and a uniform distribution in the wool. Apart from this initial problem, this residual bond content involves contamination of the suspension by micro-organisms on the occasion of each prolonged interruption, for example during the weekend, so that the suspension must be renewed each time.

If colorants also are used, the waste water must be filtered of all its colorant particles before being discarded into the sewer. This excess of bonds and pigments thus involves not only an increase in the cost of the raw material, but also in the cost of formation and of purification of waste waters. Furthermore, it can be noted in the final product, particularly when it is colored in bulk, that the mineral fibers are overladen with solid particles, which in turn involves a degradation of the desired properties.

SUMMARY OF THE INVENTION

This invention provides a molded casting from mineral wool displaying specific properties resulting from a stable and uniform incrustation of solid particles, while good distribution of the bond is obtained with an economical use of the various constituents.

Furthermore, the invention also provides a process to prepare the mineral wool for the vacuum-casting process, so as to incrust it simply and rapidly with solid particles and bond.

The molded casting provided by the invention is a casting from mineral wool displaying specific properties resulting from the addition of solid particles and including a bond.

According to the invention the solid particles are incrusted among the mineral fibers in the form of islets and are selected with an average particle measurement below or equal to 4 microns. These molded castings are produced preferably by vacuum casting.

DETAILED DESCRIPTION OF THE PREFERRED EMBODIMENTS

In a preferred embodiment the invention thus has as its objective a molded casting from mineral wool, in which solid particles are incrusted in islets among mineral fibers infused with bond, preferably from a water-based suspension. The average particle measurement of the solid particles is for this purpose below or equal to 4 microns.

Surprisingly, it has been found that such an incrustation in the form of islets makes it possible to adjust the properties of the casting to a considerable extent. For example, a molded casting may be blackened by colorant particles incrusted in the form of islets on the mineral fibers, this distinct incrustation sufficing in an amazing manner to impart complete coloration to the mineral wool, without it being necessary to coat the mineral fibers completely with the colorant. The same is true for the adjustment of other properties, such as absorption of radiation.

In a very simple manner, by incrustation over the entire thickness of the molded casting, various properties thus can be obtained. As an example, clay incrustation makes it possible to obtain molded castings withstanding very high temperatures which are capable of being used to cover steam pipes. By activated-carbon incrustation, water or gas filters can be produced. Catalysts having precisely-adjustable properties are obtained by incrustation with acids, bases, metals or their oxides. Absorbers of microwaves and notably of radar waves can be obtained with incrustation of carbon black or graphite, such castings being used most specifically for areas close to airports, to prevent interfering signals resulting from reflection of waves by structures.

The cost of manufacture is notably reduced because of the use of a smaller quantity of bond and solid particles. Furthermore, any overload of the mineral fibers a result of an excessive quantity of bond or solid particles to be incrusted is prevented, so that the risk of seeing in the mineral wool areas containing irregular incrustations due to overloading of the mineral wool is eliminated. In fact, a molded casting having very uniform properties can be obtained. Particles less than 4 microns become incrusted in a remarkable manner in islets among the mineral fibers. The particles preferably have an average measurement between 1 and 4 microns, and preferably still, between 1 and 3 microns, but smaller particles also are satisfactory and colorants notably may be used in particles on a molecular scale.

For incrustation of solid particles, organic and mineral substances which serve to form the suspension in which the bond is dispersed are appropriate as transport agents. These transport agents also serve as bond, so that it is not necessary to plan a special addition of bond. These organic and mineral substances preferably are cationic and/or anionic.

According to an illustrative example of the invention, the organic substance is composed of tylose and/or starch and the mineral substance of silica sol. The mixture of tylose, silica sol and/or starch induces the action of bond. The use of tylose makes it possible to reduce by a factor of 10 the quantities of starch, which makes it possible to obtain products which conform to fire classification Al.

With incrustation of thermoplasts or duroplasts, the mechanical performance of the casting can be improved. Silicones are conducive to hydrophobic castings capable of being placed in a moist atmosphere. Graphite particles improve the conductivity of the casting. Aluminum hydroxide or other substances having a high crystallized-water content serve to form fire-resistant molded castings such as plates for fire doors. In any event, a distinct incrustation suffices to impart the desired properties.

As mineral wool, rock wool is used in a particularly advantageous manner. The arrangement of solid particles on several layers makes it possible to refine the particle infusion in the molded casting. Clay particles, for example, may be incrusted in a first layer and colorant particles in a second. More than two layers may be prepared if necessary.

As mentioned previously, the solid-particle suspension preferably is effected with a water whose conductivity is at a least 700 μS/cm and preferably at least 800 μS/cm. This adjustment of water conductivity makes possible an impeccable incrustation of the bond and other solid particles on the mineral wool without need for an excess of silica sol, starch and/or tylose and/or other solid particles. On the contrary, if a high conductivity value is maintained, all the constituents in suspension are transported and incrusted in the mineral fibers, and practically no residue remains in the water. A reduced materials cost and also a reduction in the manufacturing cost result therefrom, notably because it no longer is necessary to decontaminate.

In a particularly advantageous method of realization, water conductivity is adjusted between 900 and 1000 μS/cm. This adjustment is obtained, for example, by addition of conductive agents such as metallic salts, notably magnesium sulphate.

Solid particles having an average measurement below or equal to 4 micrometers preferably are added to the suspension. Solid particles composed of carbons, clays, colorants,thermoplasts, duroplasts, acids, bases, metals, metallic oxides, silicones, materials with a high content of crystallized water and/or similar products are notably appropriate. Speed of incrustation is promoted by agitation at the time of addition of the various constituents.

In a particularly advantageous manner, an incrustation on several layers of solid particles is possible if, in an initial phase, the solid particles to be incrusted are mixed directly into the suspension of the water of the transport agent, notably tylose and/or starch and silica sol and mineral wool is added so that all the bond and all the solid particles are stabilized in islets among the mineral fibers, without any residue remaining in the water. In a second phase, there again may be added to the water silica sol and tylose and/or starch, as well as other solid particles to be incrusted, the incrustation of the bond with the other solid particles occurring this time among the mineral fibers already infused. If necessary, additional phases may be performed.

The quantitative measurement of the various constituents is effected in a very simple manner by adding tylose and/or starch to the dispersion until all the solid particles are incrusted among the mineral fibers.

In a practical form of implementation, the mineral wool to be dispersed is added to the water in a container with a capacity of about 5500 liters. Under constant agitation, the other constituents of the suspension, namely silica sol, tylose and/or starch and the solid particles to be incrusted, are added. For black coloration, activated carbon or carbon black preferably is incorporated at the same time as the tylose. Thus the pigment particles migrate at the same time as the bond onto the fibers and become incrusted thereon. It may be noted that the incrustation occurs in islets which appear under the microscope in the form of distinct points regularly distributed among the mineral fibers.

If the temperature stability of the molded casting is to be increased, clay is added, in which case the clay particles migrate at the same time as the bond onto the fibers.

Flocculation of fibers is promoted if the clay is added together with the potato starch.

Methylcellulose is used advantageously as tylose. Starch also may be used in place of tylose. It also is possible to add tylose and starch. It is essential that the conductivity of the water be adjusted to a value of at least 700 μS/cm, advantageously of at least 800 μS/cm. Metallic salts, such as magnesium sulphate, are particularly appropriate as additives, increasing the conductivity of the water. When the conductivity of the water is adequate, incrustation on the mineral fibers takes place after addition of the silica sol and the tylose or starch, without an excess of these constituents being required. Additional solid particles intended to impart specific properties to the molded casting, such as resistance to temperature or similar qualities, migrate at the same time as the bond onto the mineral fibers, so that, as with the bond, these solid additives do not, have to be used in excess. After incrustation on the mineral fibers, the residual water is totally pure and may be discarded as is, after having been subjected obligatorily to a filtration procedure to recover the particles of mineral wool still present. The water also may be reused directly, notably for an incrustation in several layers, by adding prior to each phase the critical constituents for the bond effect, namely silica sol and tylose and/or starch in association with the solid particles which still must be incrusted, for example clay or colorant.

Thus far only incrustations of clay and/or colorant particles have been mentioned, but other suitable solid particles may be incrusted on the mineral wool or the mineral fibers. For example, to improve absorption of radiation or increase slickness, it is possible to perform a graphite incrustation, for which purpose particles of graphite are added to the suspension intended to disperse the mineral wool.

Preferably, the solid particles added have an average particle measurement below or equal to 4 microns and preferably between 1 and 3 microns. At the time of colorant incrustation, it also is possible to add particles whose measurements are in the molecular area.

Having generally described this invention, a further understanding can be obtained by reference to certain specific examples which are provided herein for purposes of illustration only and are not intended to be limiting unless otherwise specified.

For a molded casting displaying resistance to cumulative heat, the following composition typically can be used:

98.939 wt. %:$H_2O$
0.0989 wt. %:$MgSO_4$
0.0074 wt. %:tylose
0.5194 wt. %:mineral wool
0.0890 wt. %:clay
0.3463 wt. %:silica sol For a molded casting colored black, the following composition typically can be used:

99.000 wt. %:$H_2O$
0.0742 wt. %:$MgSO_4$
0.0396 wt. %:starch
0.5399 wt. %:mineral wool
0.3467 wt. %:silicon sol
0.00248 wt. %:Fakunyl black For a microwave absorber, the composition of the suspension is, for example, the following:

98.76 wt. %:$H_2O$
0.09876 wt. %:$MgSO_4$
0.37037 wt. %:suspension of carbon black at 10%
0.00493 wt. %:tylose
0.02469 wt. %:anionic silicon sol (at 405)
0.34566 wt. %:cationic silica sol (at 30%)
0.54318 wt. %:mineral wool Obviously, numerous modifications and variations of the present invention are possible in light of the above teachings. It is therefore to be understood that within the scope of the appended claims, the invention may be practiced otherwise than as specifically described herein.

We claim:

1. A mineral wool molded casting obtained by vacuum casting, comprising solid particles and mineral fibers which are stabilized by a binder, wherein said solid particles are incrusted among the mineral fibers in the form of islets and have an average particle size below or equal to 4 microns.

2. The molded casting of claim 1, further comprising an organic and a mineral substance used as transport agents for the incrustation of said solid particles.

3. The molded casting of claim 2, wherein said organic and mineral substance are of an anionic or cationic nature, or both.

4. The molded casting of claim 2 wherein said mineral substance is silica sol and said organic substance is tylose or starch, or both.

5. The molded casting of claim 1, wherein said solid particles are particles of carbon, clay, colorant, thermoplast, duroplast, acid, base, metal, metallic oxide, silicone or material having a high crystallized-water content.

6. The molded casting of claim 1, wherein particles of carbon black or graphite are said solid particles.

7. The molded casting of claim 1, wherein said solid particles are incrusted in several layers of said molded casting.

* * * * *